(12) United States Patent
Chen et al.

(10) Patent No.: US 8,633,928 B2
(45) Date of Patent: Jan. 21, 2014

(54) REDUCING THE BANDWIDTH OF SAMPLER LOADS IN SHADERS

(75) Inventors: Wei-Yu Chen, Santa Clara, CA (US); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1196 days.

(21) Appl. No.: 12/540,424

(22) Filed: Aug. 13, 2009

(65) Prior Publication Data

US 2011/0037769 A1    Feb. 17, 2011

(51) Int. Cl.
*G06T 15/50* (2011.01)
*G06T 15/60* (2006.01)
*G06T 1/00* (2006.01)
*G06F 15/00* (2006.01)

(52) U.S. Cl.
USPC .......................................... 345/426; 345/501

(58) Field of Classification Search
USPC ......................................................... 345/426
See application file for complete search history.

(56) References Cited

U.S. PATENT DOCUMENTS

2010/0328309 A1* 12/2010 Sarel et al. .................... 345/426

* cited by examiner

*Primary Examiner* — Jacinta M Crawford
(74) *Attorney, Agent, or Firm* — Trop, Pruner & Hu, P.C.

(57) ABSTRACT

Bandwidth may be conserved in messages transferred between a shader and a sampler by converting loads in array of structures format to structure of arrays format. More particularly, four four channel loads in array of structures format may be combined into a single eight channel message in structure of arrays format. Then, the eight channel message in structure of arrays format may be converted back to array of structures format.

20 Claims, 2 Drawing Sheets

REDUCING THE BANDWIDTH OF SAMPLER LOADS IN SHADERS

BACKGROUND

This relates generally to graphics processing and, particularly, to transfers of information between shaders and texture samplers.

A texture is a two-dimensional array of pixel data. A sampler is an object that describes how to apply a texture bit map to a shape's surfaces to be displayed. A vertex shader calculates the position of each vertex of an object to be displayed, as well as the value of each per vertex attribute.

Data is exchanged between a sampler and a vertex shader. Conventionally, data is transferred by so-called sampler messages. Sampler message latency in shaders is often a performance bottleneck in three dimensional graphics processors.

In the vertex shader, using single instruction multiple data (SIMD) processing, loads from the sampler are converted into a four channel message, which returns one register's worth of data. Four four channel sampler messages include four registers worth of data in structure of arrays format, with each load returning one register's worth of data.

DETAILED DESCRIPTION

Figure 1:
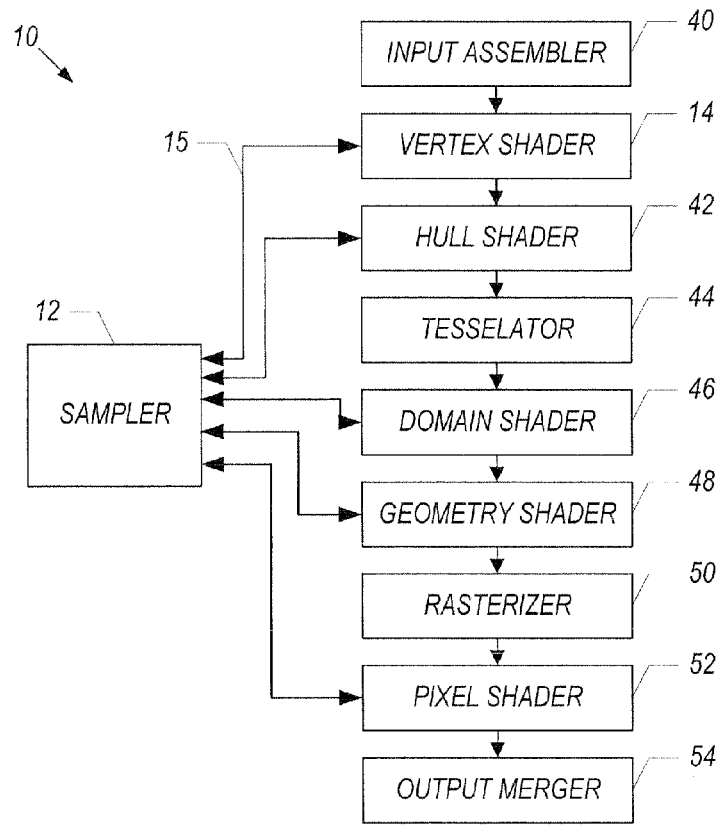
FIG. 1 is a schematic depiction of one embodiment of the present invention.

Referring to FIG. 1, a graphics processing unit 10 may be integrated circuits combined as a chipset, a single integrated circuit or as a portion of another integrated circuit, such as a central processing unit, to mention a few examples. The graphics processing unit 10 may include a vertex shader 14 to communicate via sampler messages with a sampler 12. The messages traverse a bandwidth limited pipeline 15.

A "structure" is a collection of data. An "array" is a sequence. Every pixel value, such as a color value, has four channels known as the X, Y, Z, and W channels. Thus, a pixel value X6 is a pixel value for the X channel, sixth vertex. The pixel values are floating point values.

A struct or structure may have four floating point values. An array of structures is a set of several parallel structs, which may also be referred to as channel-parallel format.

A structure of arrays, also referred to as a channel-serial format, repeats the X pixel values, the Y pixel values, then the Z pixel values, and the W pixel values serially for each vertex.

Single instruction multiple data can be used to describe a kind of parallel processing architecture that exploits data parallelism at the instruction level. It can also be used to describe the instructions in such an architecture. An array of structure may form a structure of four vectors as a series of pixel values WZYX for each vector. A structure or array may include four registers, each register includes one of the X, Y, Z, or W values. Thus, the array of structures is a transpose of the structure of arrays and vice versa. The array of structures stores one vector in a register and the next vector in another register. The structure of arrays stores one data element of each vector in a register and the next element of each vector in the next register and so on.

A physical register may have 256 bits which may be used to store eight floating bit data elements. For three dimensional graphics usage, the mode of operation may loosely be termed up to the data structure as SIMDm×n, where "m" is a numerical term describing the size of the vector and "n" is the number of concurrent program flows executed in SIMD." Thus, with array of structures, there is SIMD4, which is short for SIMD4×1, standing for the mode of operation where a SIMD operation operates on four element vectors stored packed in the registers. There is only one program flow. SIMD4×2 stands for the SIMD operation based on a pair of four element vectors stored in a register. There are effectively two programs running side-by-side with one vector per program.

Execution with structure of arrays data structure is also referred to as channel-serial execution includes SIMD8, which is short for SIMD1×8, which stands for the SIMD operation based on the structure of arrays data structure where one register contains one data element (the same one) of eight vectors. Effectively, there are eight concurrent program flows. SIMD16 is short for SIMD1×16 that is a special term indicating the use of instruction compressor, whereas each compressed SIMD instruction operates on a pair of registers that contain one data element (the same one) of 16 vectors. SIMD16 has 16 concurrent program flows. In SIMD4×2 mode of operation, two corresponding vectors from two program flows fill a physical register. The source swizzles control the routing of source data elements to the parallel adders corresponding to the destination data elements.

In some embodiments, the ability to transfer data more quickly may be increased by transforming a higher number of loads (e.g. four four channel loads or eight two channel loads) in array of structures format to a smaller number of loads (e.g. a single eight channel message) in structure of arrays format, decreasing latency and increasing bandwidth.

A graphics processor unit 10 graphics pipeline may include a set of fixed function units arranged in pipeline fashion which process three-dimensional (3D) related commands by spawning threads. Typically, this process includes rendering primitives.

The input assembler 40 (FIG. 1) is responsible for reading primitives, such as points, lines, and/or triangles, from user buffers and to assemble primitives for later stages.

The vertex shader 14 is an application program interface supplied program that calculates vertex attributes. It also refers to a unit that dispatches threads to shade or calculate the attributes for vertices.

The hull shader 42 converts control points from one representation to another. The converter control may be sent directly to the domain shader. The hull shader may also compute tessellation factors for the tessalator.

The tesselator 44 is a fixed function unit that uses the tessellation factors to subdivide a patch into multiple primitives.

The domain shader 46 evaluates the surface representation of each vertex of each vector. The domain shader sends vertex data to the geometry shader.

The geometry shader 48 is a fixed function unit that dispatches geometry shader threads on its input primitives. Application supplied geometry shaders expand each input primitive into several output primitives in order to perform three dimensional modeling algorithms.

The rasterizer 50 converts an object represented by vertices into a set of pixels that make up the object. The pixel shader is a shader that is supplied by an application translated by jitter and is dispatched to an execution unit by the windower once per pixel.

The output merger 52 generates the format rendered pixel color using a combination of pipeline states, data from pixel shaders, and other sources.

This transformation may be done, in one embodiment, by combining the individual loads, normally associated with four four channel messages into a single eight channel message that can return 4 registers worth of data at a time, thereby reducing sampler traffic. Thus, multiple smaller loads may be combined into fewer larger loads.

Each load instruction from a shader 14, 42, 46, or 48 to the sampler 12 accesses the same resource buffer, so only one address component is necessary in most cases. Furthermore, the address of all the loads can be expressed in the format of r0.x+K, where the value of r0.x is the same for all the loads and K is an immediate constant. Therefore, the compiler may generate a four channel (SIMD4×2) sampler message to perform a load that returns one register's worth of data in array of structures format. Four loads are used to provide the necessary information. Since all of the loads share a common base, they may be combined into a single SIMD8 message that returns all the requested data at once.

Figure 2:
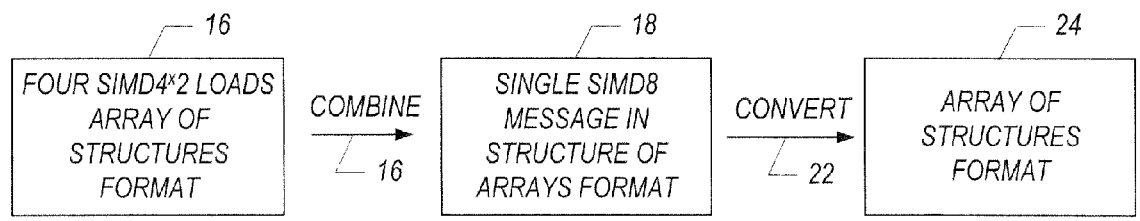
FIG. 2 is a depiction of a sampler load in accordance with one embodiment.

Thus, referring to FIG. 2, four SIMD4×2 loads 16 in array of structures format may be combined, as indicated at 20, into a single SIMD8 message in structure of arrays format, as indicated at block 18. The structure of arrays format messages may then be combined, as indicated at 22, to provide an array of structures format, as indicated in block 24.

Figure 3:
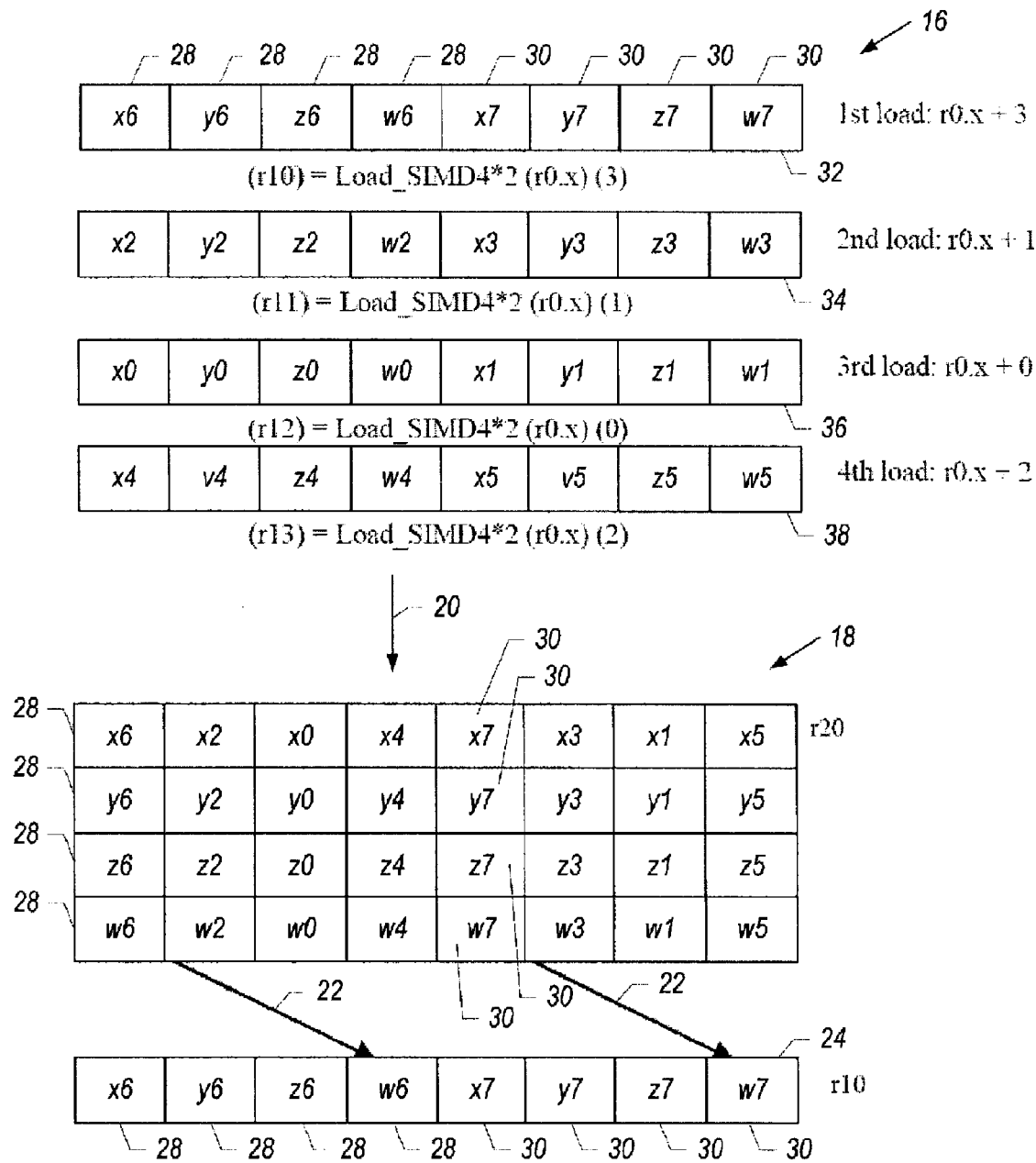
FIG. 3 is a more detailed depiction of the embodiment shown in FIG. 2.

Thus, referring to FIG. 3, each of four loads 32, 34, 36, and 38 is made up of one registers worth of data. Thus, the loads are in SIMD4×2 format. They include, in each case, eight pixel values. The pixel values may include a first four values 28 and a second four values 30, as indicated, for example, in connection with the load 32 in FIG. 3. The four SIMD4×2 loads 32-38 may be combined, as indicated at arrow 20, into a single SIMD8 load 18. This may be done by transforming the information from array of structures format to structure of arrays format. Thus, the eight values 28 that extend serially in load 32, extend parallelly in SIMD8 load 18. The same result occurs for the values 30 in single load 32 in structure of arrays format that becomes structure of arrays data, as indicated at 18 in FIG. 3.

Finally, the SIMD8 load in structure of arrays format is then converted, as indicated by the arrows 22, back into array of structures format. This results in one load 24 that provides all of the data in structure of arrays format.

The SIMD8 load returns four registers in structure of arrays format by taking in, as parameters, the constant offsets for each load. The merged load 18 can be placed in front of the first load instruction, when the value r0.x is guaranteed to be available. The data is then converted back to array of structures format by replacing the original SIMD4×2 load instructions with move instructions that use swizzles or vector rearranging to read a vertical strip of data, as indicated by the arrows 22. Thus:

(r10.x)=MOV(r20.x), (r10.y)=MOV(r21.x), (r10.z)=MOV(r22.x), and (r10.w)=MOV(r23.x).

The first load reads channel x of the SIMD8 return values, the second load reads channel y of the SIMD8 return values, the third load reads channel z of the SIMD8 return values, and so on.

Thus, in some embodiments, sampler load messages may be optimized by introducing the use of SIMD8 messages to the vertex shader. The ability to combine individual sampler load messages, in order to reduce their latency, may increase throughput in some embodiments. The sampler data is then converted between different execution modes. Particularly, the data is converted between channel serial and channel parallel execution modes.

While SIMD4×2 loads are converted to SIMD8, any numbers of smaller loads of any size (e.g. SIMD4×2, SIMD4×1) may be combined into a smaller number of larger loads (e.g. SIMD8, SIMD16) in some embodiments.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    transferring messages between a shader and a sampler by converting loads in array of structures format to structure of arrays format and then back to array of structures format.

2. The method of claim 1 including converting single instruction multiple data loads in array of structures format to a single instruction multiple data message in structure of arrays format having more channels.

3. The method of claim 2 including converting an eight channel message from array of structures format to structure of arrays format.

4. The method of claim 3 including using swizzles to read a vertical strip of data.

5. The method of claim 4 including using move instructions that use swizzles to read a vertical strip of data.

6. The method of claim 1 including returning four registers of data at a time.

7. The method of claim 1 including transferring messages between a vertex shader and a sampler.

8. The method of claim 1 including transferring messages between a hull shader and a sampler.

9. The method of claim 1 including transferring messages between a geometry shader and a sampler.

10. The method of claim 1 including transferring messages between a domain shader and a sampler.

11. A graphics processing unit comprising:
a sampler; and
a shader, said shader to transfer messages to the sampler by converting loads in array of structures format to structure of arrays format and then back into array of structures format.

12. The unit of claim 11, said shader to convert single instruction multiple data loads in array of structures format to a single instruction multiple data message structure of arrays format having more channels.

13. The unit of claim 12, said shader to convert an eight channel message from structure of arrays format to an array of structures format.

14. The unit of claim 13, said shader to use swizzles to read a vertical strip of data.

15. The unit of claim 14, said shader to use move instructions that use swizzles to read a vertical strip of data.

16. The unit of claim 11, said shader to return four registers of data to time.

17. The unit of claim 11 wherein said shader is a vertex shader.

18. The unit of claim 11 wherein said shader is a hull shader.

19. The unit of claim 11 wherein said shader is a geometry shader.

20. The unit of claim 11 wherein said shader is a domain shader.

* * * * *